No. 784,579. PATENTED MAR. 14, 1905.
C. J. LUCE.
ART OR METHOD OF COMPRESSING COTTON OR OTHER FIBROUS MATERIALS.
APPLICATION FILED FEB. 12, 1904.
2 SHEETS—SHEET 1.
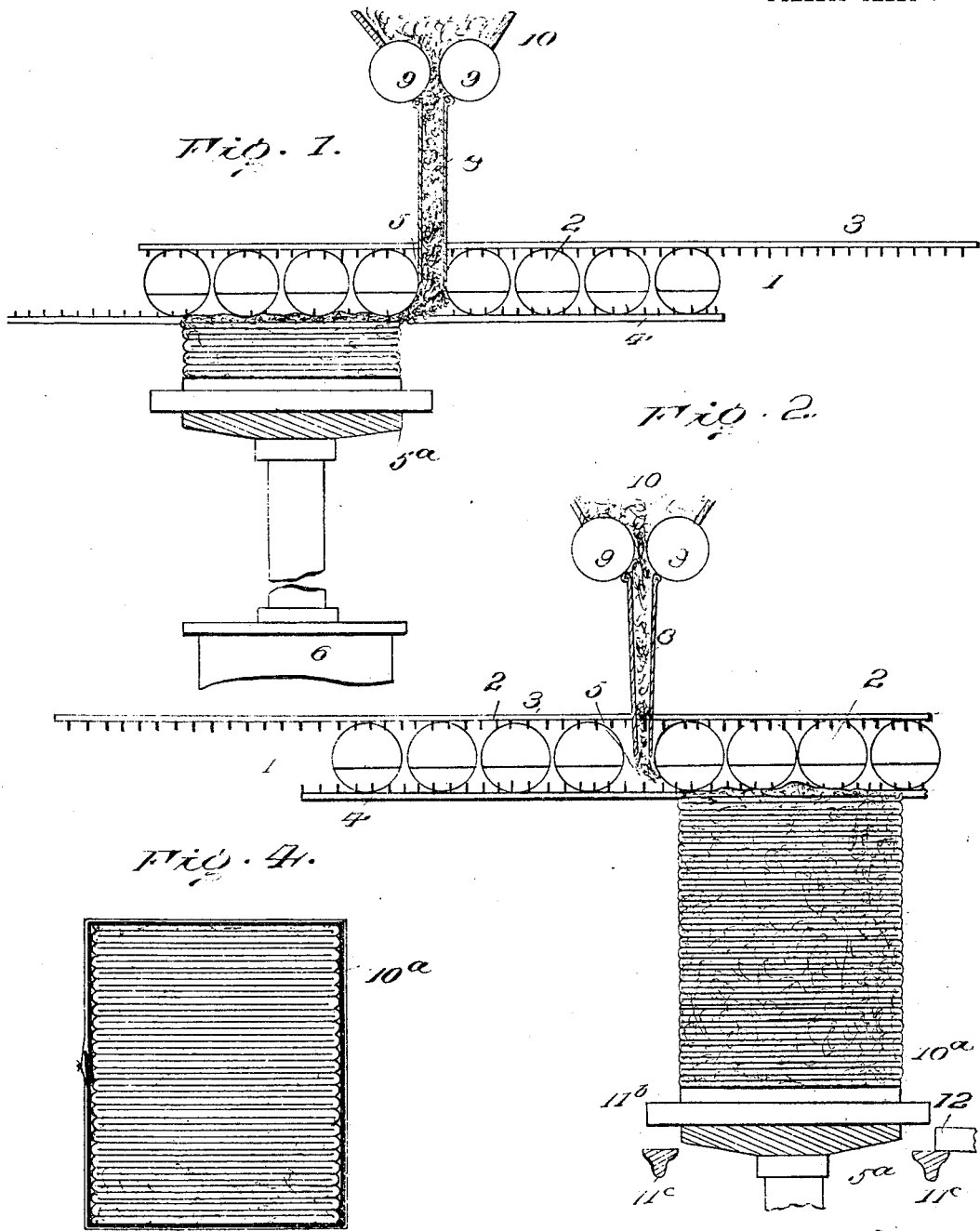

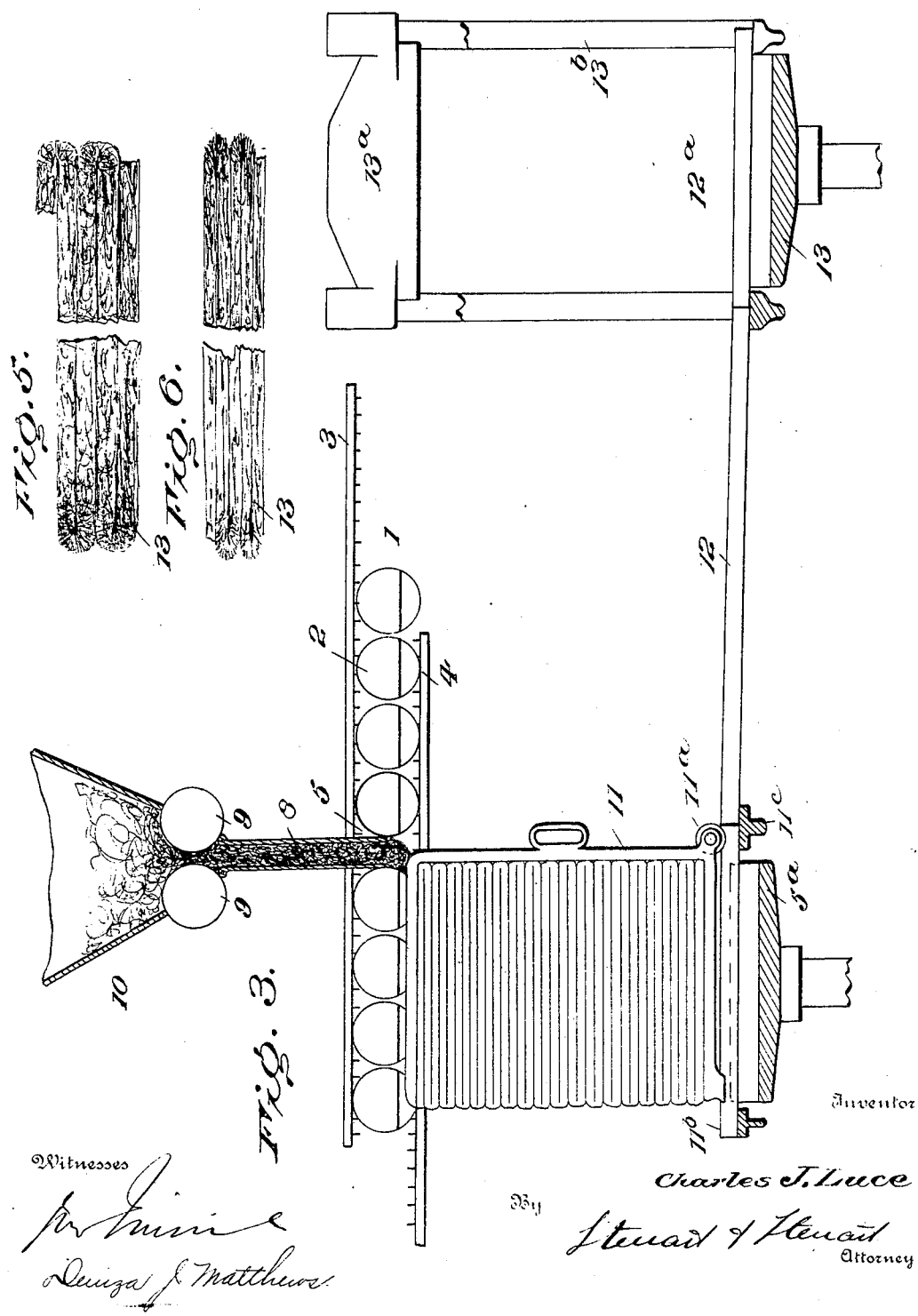

No. 784,579.

Patented March 14, 1905.

UNITED STATES PATENT OFFICE.

CHARLES J. LUCE, OF NIANTIC, CONNECTICUT, ASSIGNOR TO LUCE COMPRESS & COTTON COMPANY, A CORPORATION OF DELAWARE.

ART OR METHOD OF COMPRESSING COTTON OR OTHER FIBROUS MATERIALS.

SPECIFICATION forming part of Letters Patent No. 784,579, dated March 14, 1905.

Application filed February 12, 1904. Serial No. 193,329.

*To all whom it may concern:*

Be it known that I, CHARLES J. LUCE, a citizen of the United States of America, and a resident of Niantic, State of Connecticut, have invented certain new and useful Improvements in the Art or Method of Compressing Cotton or other Fibrous Materials, of which the following is a specification.

My invention relates to a process for making a bale of suitable density, size, and shape of cotton or any other fibrous material.

Generally speaking, my mode of forming a bale is to form a continuous wad of compressed cotton and then to lay down this continuous wad in successive laps or layers upon each other under pressure, maintaining the pressure originally imparted to the cotton when the continuous wad was formed and increasing it. My method also involves the rolling of the layers or laps as they are laid down with a series of rollers successively operating upon the layer while it is maintained under pressure. Heretofore others have formed a bale by the same general mode which I employ of forming a continuous wad of cotton and laying that wad down fold upon fold and compressing the bale thus formed to a suitable density; but I have discovered certain facts with reference to the behavior of cotton under certain conditions which enable me to produce a bale of cotton formed of a continuous wad laid layer upon layer and compressed of greater density than has heretofore been possible, and I have accomplished this density with less effort, in shorter time, and with greater regularity of result than has ever heretofore been done. At the same time I accomplish another very important result: I produce a bale which, although having a density of from thirty to forty pounds to the cubic foot—a density so great as to preclude the possibility of satisfactory sampling of the bale when so compressed—has upon two of its sides a layer of cotton having a density as low as five or six pounds to the cubic foot.

In an application for patent filed by me on the 2d day of July, 1902, Serial No. 114,128, and in another application filed concurrently herewith I have described in detail the machines with which I have performed the operations involved in the method herein described and claimed; but the method is capable of being performed in many other different ways and by different mechanisms.

I have by experience established certain facts which I believe to be essential to the successful use of my method. I have found that if the bale be formed under a pressure in the forming-press which will produce a density of about fifteen pounds to the cubic foot and if then the bale when finished be transferred to a certain compress for the purpose of increasing the density of the bale to thirty pounds to the cubic foot a certain power in the second press will be necessary, whereas if the bale be formed in my press or one of similar construction of a continuous wad of cotton formed and held under pressure and then laid down layer upon layer upon the bale-forming press under a pressure which will produce a density in the bale as formed of twenty-seven pounds to the cubic foot that a bale thus formed loses to a great extent its power of expansion and may be removed from the forming-press without binding and when transferred to the second press may be compressed to a density of thirty pounds to the cubic foot or even as much as forty pounds to the cubic foot with less than half the power required to produce thirty pounds to the cubic foot when the density in the forming-press was only fifteen pounds to the cubic foot. I do not know the physical reason for this result, but I am of the opinion that it is produced by the exclusion of air from the continuous wad of cotton as it is laid down upon the bale in the operation of forming. Probably the air is not only excluded from the interstices between the fibers of cotton, but it is also excluded from the cells of the fibers. When, therefore, a bale of this kind consisting of nothing but cotton fiber, with little or no included air, is transferred to a second compress for the purpose of increasing its density, the resistance offered to the second compress is only such resistance as is offered by the vegetable structure of the cotton itself and not by any air which has to be compressed as the bale itself is compressed. I have discovered a further fact that if when the bale is formed by laying down a continuous wad of compressed cotton lap upon lap the compression-rollers are carried in their stroke back and forth across the top of the bale to or beyond the extreme edge of the bale the bale will be of uniform density to the extreme edge and sampling will be very difficult. If, however, the operative rollers are stopped in their travel at a distance of an inch or an inch and a half from the edge of the bale and the lap of the wad is formed without compression by the rollers except such as results from the passage of the following roller by which the lap is formed over it, the fold of the wad at the edge of the bale will when the bale is finished possess a density of only five or six pounds to the cubic foot. I attribute this result to a lateral expansion of the wad during the operation of forming the bale, which results in giving to the bale on two of its sides— those where the folds of the wad occur—a softness sufficient to permit sampling.

The machine illustrated in this case is substantially the same as that described in the applications above referred to, but is shown herein diagrammatically.

Figure 1 is a diagram showing the mode of forming a bale by laying down a continuous wad of compressed cotton lap upon lap upon a follower pressed upward by suitable means. Fig. 2 shows the same structure with a bale nearly finished and the compressing-carriage in an opposite position from that shown in Fig. 1. Fig. 3 shows the same structure with the secondary press attached, showing a bale finished and held in temporary clamps for removal of the second press. Fig. 4 is an elevation of the bale as bound in ties. Fig. 5 is a diagrammatic view showing the appearance of several laps or folds of the continuous wad laid down upon each other with less than maximum compression, and Fig. 6 shows the same with maximum compression.

In the drawings the same numerals indicate the same parts in all figures.

1 represents a reciprocating platen, the framework of which is not shown, but in which are mounted the series of rollers 2 2. Each roller is independently revolved by racks 3 and rolls on tracks 4. An aperture 5 is maintained between the two central rollers of the series. This aperture is of a size greater than the aperture between the feed-rolls of the hopper. Through this aperture the cotton is fed to the compress.

$5^a$ represents a pressure-head or follower of a suitable hydraulic press operated by a piston in a cylinder 6.

A throat 8 is located above the aperture 5, composed of two plates pivoted below the feed-rolls 9 9 and extending down to a point between the center rolls 2 2 as far as the axes of those rolls. At the upper ends of said throat are feed-rolls 9 and a hopper 10, in which the cotton is received and from which it is drawn by the feed-rolls 9 9. It will be understood that the hopper, feed-rolls 9 9, and throat 8 are a structural part of the reciprocating platen and travel with it back and forth across the stationary follower $5^a$, the hopper, its throat, and the roller-platen maintaining their relative positions at all times.

Cotton is introduced into the hopper 10 and is fed between the feed-rolls 9 9, and as it passes between them it is semicompressed and crowded into the throat and formed into a continuous wad. This is accomplished by the fact that the rolls 9 9 revolve at a greater speed than the reciprocation of the roller-platen, so that the cotton is forced down by the rolls 9 9 into the throat faster than it is taken away from the bottom of the throat by reciprocation of the rolls 2 2. Hence there is a certain degree of compression in the throat, which is a valuable element in the process. When the density in the throat becomes sufficient, the rolls 9 9 will slip and not increase that density, although they will maintain it. The wad once formed in the throat is confined and held under pressure, and from the very beginning of its formation it is forced down continuously and kept under pressure and is then delivered to the press in a continuous wad under a constant pressure throughout its whole extent. It will thus be seen that the cotton fed into the throat is first formed into a continuous bat and is semicompressed. By reference to Figs. 1 and 2 it will be noticed that when the roller-platen is in its extreme position and one of the center rolls has reached the extreme limit of its throw its bite, represented by a vertical plane passing through its axis, will stand a short distance back from the edge of the bale. In practice this distance is about an inch and a half. This position of the rolls will leave the wad which is being forced down through the throat without any support below for a period of time, during which the change of direction in the roller-platen takes place. This period of time will be sufficient to permit the small portion of cotton thus unsupported to expand somewhat. As the first roller of the roller-platen returns upon the wad it will make a fold in the wad in the center of this portion which has expanded, being relieved from pressure, and thus lay down at the edge of the bale a portion of the wad which has been given an opportunity to expand before it was folded. As soon as this expanded portion has been laid down the roller will then continue to lay down upon the bale the wad as it comes from the throat, and for the remainder of the stroke across the bale the pressure of the throat upon the wad will be continuous, will be unrelieved, and will be augmented by the pressure of the rollers as they successively pass over it. The platen in this mode continues to reciprocate back and forth, laying down fold upon fold of the continuous wad upon the bale; but at each change in the direction of the motion of the roller-platen the wad at the point of folding is left for a short period of time unsupported, and during that period of time it is permitted to expand, so that when folded and laid down upon the bale the fold will be of less density than the remainder of the bale.

As previously stated, the pressure which I have found suitable for the most successful use of my process, as described, is the pressure which will produce a density of about twenty-seven pounds to the cubic foot. A bale completed by my method and under this pressure, as described, may be released from the press and transferred to another compress without binding. I have found by experience that for a period of time sufficient to make this transfer a bale formed as described will not expand. This is probably due to the almost total exclusion of air and the adhesion of the fibers to each other. In order, however, to handle the bale easily and transfer it quickly to the second compress, I provide a pair of U-shaped holders 11, which are provided on their lower corner with rollers 11ª.

11ᵇ represents loose rails carried by the follower of the compress 5ª and standing a short distance below the level of the follower. When the bale is laid down upon the follower, its ends project beyond the ends of the follower and overhang these rails 11ᵇ.

11ᶜ represents supports for the rails 11ᵇ, with which they will contact as the follower descends.

When the bale is finished and the follower is drawn away from the roller-platen, two holders 11 may be placed upon the bale by inserting the two racks of the holder above and below the bale, the roller 11ª resting upon the track-bar 11ᵇ. The follower 5ª may then be still further depressed and drawn away from the bale, when the track-bar 11ᵇ will rest upon its supports 11ᶜ 11ᶜ and the bale will be held supported in the holders 11 11 upon the track-bar 11ᵇ. 12 12 are tracks connecting the first compress with the second compress. The second compress is numbered 12ª and is provided with a follower 13 and a yoke 13ª, held to the base by suitable rods 13ᵇ. The bale may now be moved in its holders 11 on the track 11ᵇ and 12 from the first compress to the second compress. The second compress may now be started, and as the follower 13 compresses the bale the holders 11 may be removed, and when the bale has reached the desired compression in the second compress permanent ties may be placed around it.

One of the advantages of my mode of baling lies in the fact that the cotton is received in my hopper as it comes from the gin, carried by suction, the fibers of cotton being to a greater or less extent parallel with each other as they are carried along by the current of air. They pass immediately into the hopper and thence into the bale with little or no change in their arrangement, the result being that they are laid down upon the bale in a continuous wad, the fibers being more or less parallel to the continuous wad. This insures a wad which is smooth, homogeneous to a great extent, adherent, and which retains its identity no matter what amount of pressure may be applied to the bale for compression. When the bale is opened, the continuous wad may be reeled off from the bale as if it were a woven fabric. The fiber is preserved unbroken and unfelted, expands freely when exposed to the air, and is generally uninjured by the operation of baling, and is so easily distributed when the bale is opened as to greatly facilitate the subsequent manufacturing operations.

I am aware of the fact that baling-presses employing a series of reciprocating rollers for the purpose of folding and laying down a continuous wad of cotton layer upon layer to form a bale have been made and used; but as far as I know none of these machines have ever produced a bale from which the air has been sufficiently excluded to destroy the elasticity of the bale and to permit of its further compression with comparatively small power. I believe I am the first person who has ever discovered the critical conditions necessary to produce the result which I have accomplished. Those conditions consist in laying down a continuous web layer upon layer to produce a bale and subjecting the bale and the layer as it is laid down to a pressure sufficient to produce a density of about twenty-seven pounds to the cubic foot and applying that pressure in a series of vertical planes of pressure which are caused to advance back and forth across the bale to the layer as each layer is laid down. By these means sufficient pressure is applied to each layer as it is laid down to exclude the air, and the pressure is applied in a series of vertical planes which are caused to advance back and forth across the layer as it is laid down, so as to work out the air contained in each layer and prevent it from returning. I believe that I am the first one to have discovered that if the vertical planes of pressure are not permitted to extend in their travel to the full width of the bale, but are stopped some distance short of the fold of the layer, the fold will expand laterally and produce a soft surface on each side of the bale of sufficient depth to permit a very hard bale to be sampled with ease.

By the expressions "a continuous pressure," "without relieving the pressure," &c., which are used in the claims, I intend to convey that the material is maintained under continuous pressure, not necessarily continuously under the same pressure, but continuously under a degree of pressure throughout its entire extent.

Having thus described my invention, what I claim, and desire to secure by Letters Patent, is—

1. The art of forming a bale which consists of first forming a continuous wad under pressure, maintaining the pressure upon the wad and then folding the wad into layers and piling the layers one upon the other in bale form, applying to the wad as it is laid down a continuous pressure greater than the original compression applied to the wad, substantially as described.

2. The art of forming a bale which consists of first forming a continuous wad under pressure, maintaining the pressure upon the wad and then laying down and folding the wad into layers and piling them one upon the other in bale form, the operation of laying down being performed under a continuous pressure, substantially as described, sufficient, when the bale is completed, to prevent its immediate expansion.

3. The art of forming a bale which consists of first forming a continuous wad, maintaining the pressure upon the wad and then folding the continuous wad into layers and laying the layers down upon each other to form a bale and maintaining upon the bale and the layers as they are laid down a continuous pressure sufficient to produce in the bale a density of about twenty-seven pounds to the cubic foot.

4. The art of forming a bale which consists of first forming a continuous wad under pressure, maintaining the pressure upon the wad and then folding the wad into layers and laying the layers down one upon the other in bale form, applying to the layers as they are laid down a pressure sufficient to produce a density of about twenty-seven pounds to the cubic foot by means of a procession of pressure devices which are caused to travel back and forth across the bale as the layers are laid down, applying the desired pressure to the layers as they are laid down in a series of vertical planes which are caused to travel back and forth across the layers and the bale as the layers are laid down.

5. The art of forming a bale which consists of first forming a continuous wad under pressure, then folding the wad into layers and laying the layers down one upon another in bale form, while maintaining the primary pressure upon the wad at all times except at the instant at which the fold of the wad occurs, when the pressure is relieved temporarily, then applying to the wad as it is laid down a pressure greater than that applied to the wad during its formation, the baling pressure being applied in a series of distinct vertical planes separated from each other, which are caused to travel back and forth across the bale, and the layers as they are laid down, the exterior of said vertical planes of pressure on each side stopping short in their travel of the fold of the layer on each side of the bale.

6. The art of forming a bale which consists of first forming a continuous wad, maintaining the pressure on the wad and then folding the wad into layers and laying the layers down one upon the other in bale form, applying to the layers as they are laid down a pressure sufficient to produce a density of about twenty-seven pounds to the cubic foot by means of a procession of pressure devices which are caused to travel back and forth across the bale as the layers are laid down, applying the desired pressure to the layers as they are laid down in a series of vertical planes which are caused to travel back and forth across the layers and the bale as the layers are laid down.

7. The art of forming a bale which consists of first forming a continuous wad, maintaining the pressure on the wad and then folding the wad into layers and laying down the layers one upon another to form a bale, the layers being laid down under a pressure sufficient to produce in the bale a density of about twenty-seven pounds to the cubic foot, and this pressure being applied in a series of vertical planes separated from each other, which vertical planes of pressure are caused to advance back and forth across the bale and the layers as they are laid down.

8. As a new article of manufacture, a bale of cotton or other similar material formed of a continuous wad folded into layers, which are piled one upon the other to form the bale, the body of the bale having a high density and the folds of the wad which form the two sides of the bale having a low density, substantially as described.

9. The art of forming a bale which consists of forming a continuous wad by a preliminary pressure, and forming the wad into a bale, subjecting said bale to a greater pressure than that given the wad without relieving the pressure on the wad.

10. The art of forming a bale which consists of forming a continuous wad under a constant forcing pressure, and forming the wad into a bale, and subjecting said bale to a greater pressure than that given the wad without relieving the pressure on the wad.

11. The art of forming a bale which consists of first forming by pressure a wad, forming the wad into a bale, and then immediately giving said bale a greater compression than the pressure on the wad without relieving the first-named pressure.

12. The art of forming a bale which consists of forming a continuous bat and semicompressing it into a wad, and then forming the wad into a bale by greater pressure than the preliminary pressure, without relieving the pressure on the wad.

13. The art of forming a bale which consists of forming a wad under a constant pressure, and then laying the wad down in layers under pressure to form a bale without relieving the pressure on the wad.

14. The art of forming a bale which consists of forming a wad under a constant pressure, secondly, laying the wad down in successive layers to form a bale without relieving the pressure on the wad, and thirdly, applying a pressure to the bale greater than the pressure to form the wad.

15. The art of forming a bale which consists of forming a wad by a preliminary and continuous pressure throughout its whole extent, and then forming the wad into a bale by a greater pressure than the preliminary compression without relieving the pressure on the wad.

16. The art of forming a bale which consists of forming a wad by pressure, forcing the wad into a bale by pressure greater than the pressure on the wad and without relieving the pressure on the wad, then transferring the bale and applying pressure greater than that before given, the latter pressure being greater than the previous compressions, and then binding the bale.

17. The art of forming a bale which consists of forming a wad by pressure, forming the wad into a bale by folding it to form layers, the folding of the wad spreading and separating the fibers of the material, then applying pressure to the bale to laterally expand the folds to produce a plurality of fluffy ridges at the ends of the bale, and then binding the bale.

Signed by me at New York, county and State of New York, this 28th day of January, 1904.

CHARLES J. LUCE.

Witnesses:
  SAM. SAVAGE,
  L. H. LATHAM.